US012494952B2

(12) United States Patent
Mouret et al.

(10) Patent No.: US 12,494,952 B2
(45) Date of Patent: Dec. 9, 2025

(54) TRANSCEIVER PHYSICAL LAYER INTERFACE

(71) Applicant: NXP USA, INC., Austin, TX (US)

(72) Inventors: Guillaume Mouret, Portet-sur-Garonne (FR); Fabien Viemon, Cugnaux (FR); Guerric Panis, Cambernard (FR); Nicolas Astruc, Toulouse (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/882,046

(22) Filed: Sep. 11, 2024

(65) Prior Publication Data
US 2025/0106072 A1 Mar. 27, 2025

(30) Foreign Application Priority Data
Sep. 25, 2023 (EP) .................................. 23306593

(51) Int. Cl.
*H04L 25/02* (2006.01)
*H03F 3/19* (2006.01)
*H04B 3/20* (2006.01)

(52) U.S. Cl.
CPC ........... *H04L 25/0278* (2013.01); *H03F 3/19* (2013.01); *H04B 3/20* (2013.01); *H04L 25/0266* (2013.01)

(58) Field of Classification Search
None
See application file for complete search history.

(56) References Cited

U.S. PATENT DOCUMENTS

| 4,713,827 A | 12/1987 | Lauffer et al. |
| 6,078,204 A | 6/2000 | Cooper et al. |
| 6,100,713 A | 8/2000 | Kalb et al. |

(Continued)

FOREIGN PATENT DOCUMENTS

| CN | 212183126 U | 12/2020 |
| EP | 0818734 B1 | 5/2003 |
| JP | 2015122656 A | 7/2015 |

OTHER PUBLICATIONS

Non-final office action dated Jun. 17, 2024 in U.S. Appl. No. 18/295,540.

(Continued)

*Primary Examiner* — Sung S Ahn (57) ABSTRACT

The disclosure relates to a transceiver physical layer interface. Example embodiments include a transmission line transceiver (401) comprising: first and second terminals (406a, 406b); a control module (416); an amplifier module (414) connected between the control module (416) and the first and second terminals (406a, 406b); a switchable termination resistance circuit (408, 410) connected between the first and second terminals (406a, 406b), the switchable termination resistance circuit (408, 410) comprising a termination resistance (408) connected in series with a switch (410) controllable by the control module (416); a pair of series connected resistors (418a, 418b) connected between the first and second terminals (406a, 406b); a capacitor (420) connected between a node (423) connecting the pair of series connected resistors (418a, 418b) and a common node (422), wherein the control module (416) is configured to open the switch (410) to disconnect the termination resistance (408) during transmission of a signal via a transmission line (403) capacitively connected to the first and second terminals (406a, 406b).

20 Claims, 10 Drawing Sheets

(56) References Cited

U.S. PATENT DOCUMENTS

| | | |
|---|---|---|
| 6,480,030 B1 | 11/2002 | Taguchi |
| 6,590,413 B1 | 7/2003 | Yang |
| 7,589,574 B2 | 9/2009 | Zhu et al. |
| 10,333,744 B2 | 6/2019 | Gscheidle |
| 11,394,585 B2 | 7/2022 | Hayashi et al. |
| 2012/0309456 A1* | 12/2012 | Yamamoto ............. H04N 23/57 327/108 |
| 2014/0256276 A1 | 9/2014 | Li et al. |
| 2016/0268985 A1* | 9/2016 | Maier ....................... H03F 1/56 |
| 2023/0353129 A1 | 11/2023 | Mouret et al. |
| 2023/0353142 A1 | 11/2023 | Mouret et al. |

OTHER PUBLICATIONS

Notive of Allowance dated Sep. 25, 2024 in U.S. Appl. No. 18/295,540.
Non-final office action dated Jan. 3, 2025 in U.S. Appl. No. 18/295,557.
Final office action dated Jun. 27, 2025 in U.S. Appl. No. 18/295,557.

* cited by examiner

TRANSCEIVER PHYSICAL LAYER INTERFACE

CROSS-REFERENCE TO RELATED APPLICATIONS

This application claims the priority under 35 U.S.C. § 119 of European Patent application no. 23306593.7, filed on 25 Sep. 2023, the contents of which are incorporated by reference herein.

FIELD

The disclosure relates to a transceiver physical layer interface.

BACKGROUND

In a communication system comprising a pair of transceivers passing signals along a transmission line, a termination resistance at each transceiver serves to reduce reflections along the transmission line.

Figure 1:
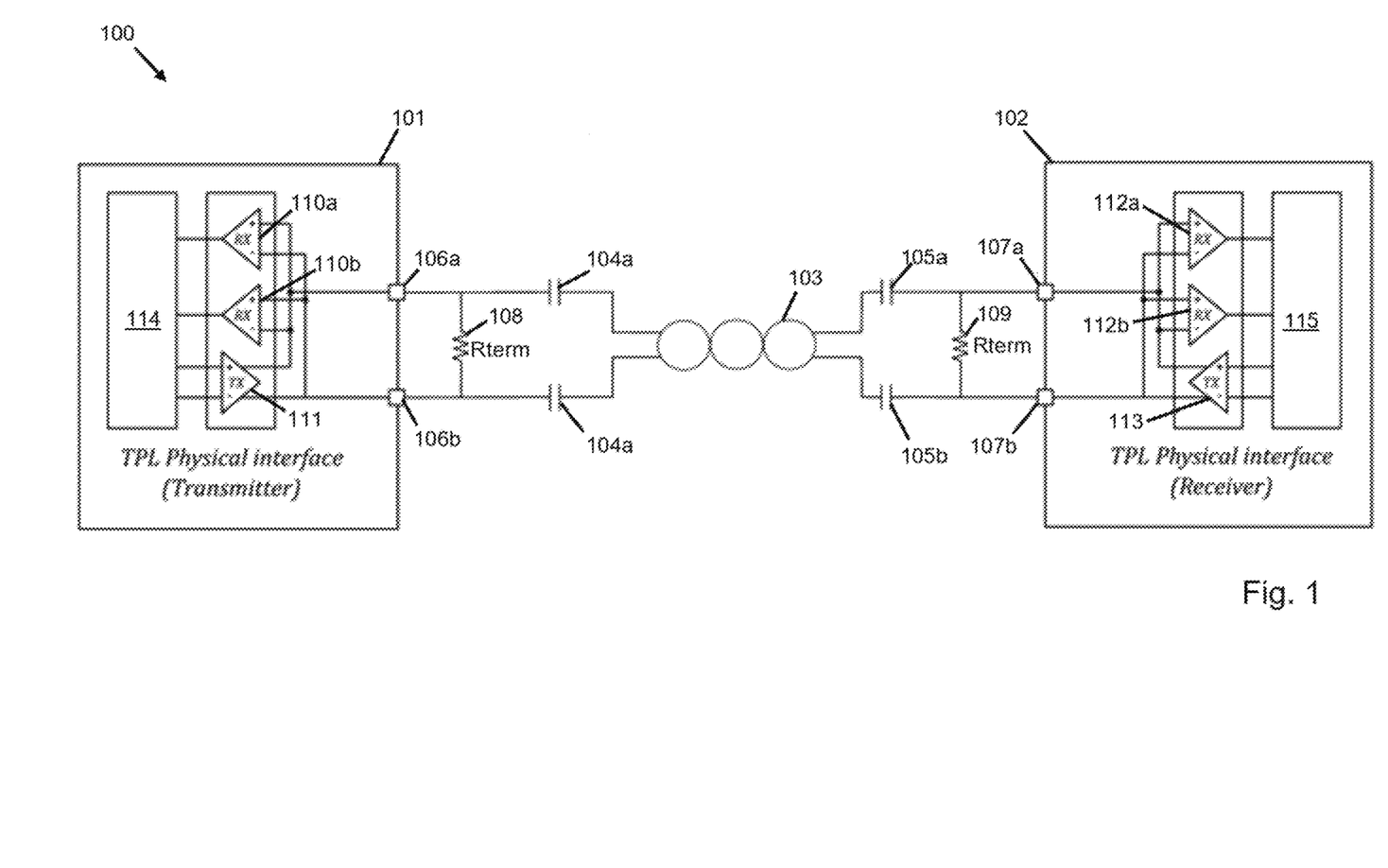
FIG. 1 is a schematic diagram of a communication system comprising a pair of transceivers connected with a capacitively coupled transmission line.

An example of a communication system comprising a pair of transceivers connected by a transmission line is illustrated in FIG. 1. The system 100 comprises first and second transceivers 101, 102 connected by a transmission line 103, which in this example comprises a twisted wire pair. Each transceiver 101, 102 is the physical interface of a transformer physical layer (TPL). The transmission line 103 is isolated from the transceivers 101, 102 by isolation capacitors 104a, 104b, 105a, 105b at either end of the transmission line 103. In the illustrated example, the first transceiver 101 is in transmit mode and the second transceiver 102 is in receive mode. Each transceiver 101, 102 comprises a pair of terminals 106a, 106b, 107a, 107b that connect to the transmission line 103 via respective capacitors 104a, 104b, 105a, 105b. A termination resistance Rterm 108, 109 is connected between the terminals of each transceiver 101, 102. Each transceiver 101, 102 comprises two receiver amplifiers RX 110a, 110b, 112a, 112b and one transmitter amplifier TX 111, 113 connected between the terminals 106a, 106b, 1071, 107b and a control module 114, 115.

Figure 2:
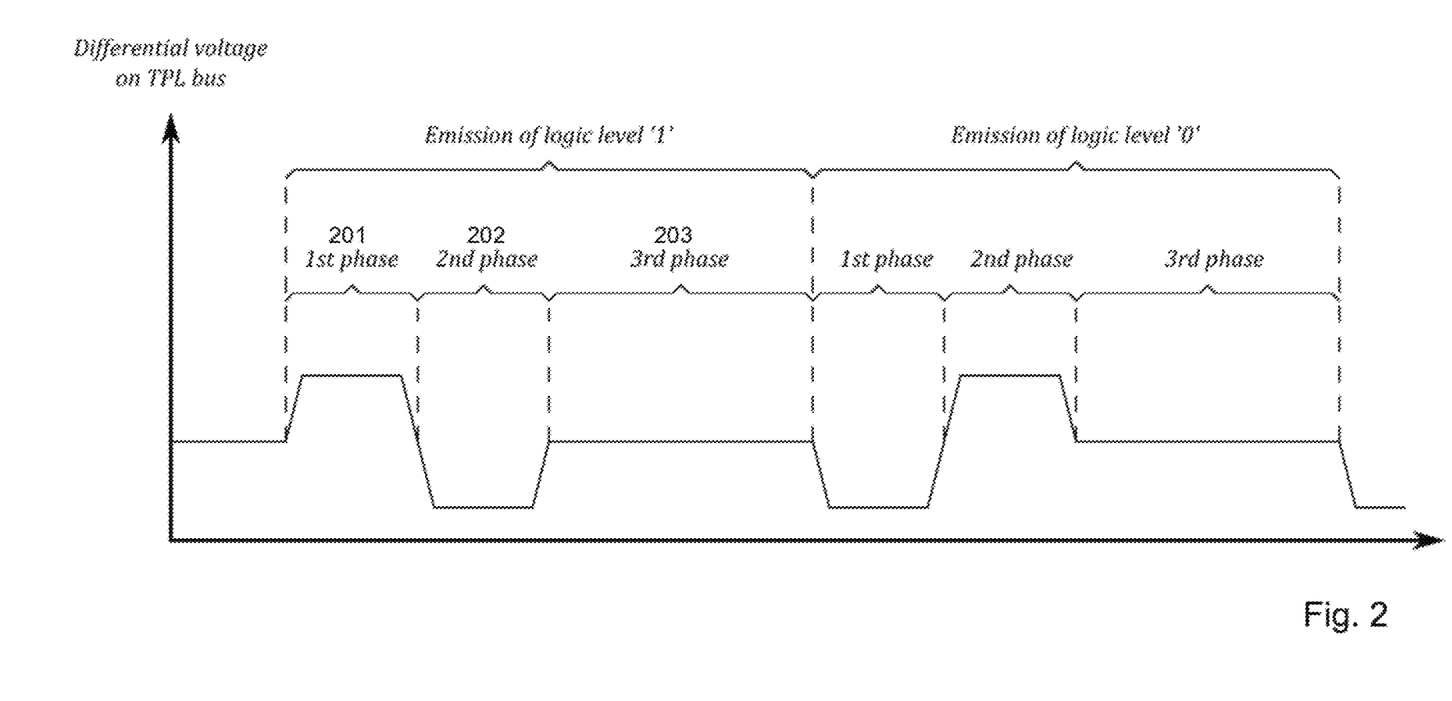
FIG. 2 illustrates a schematic illustration of differential voltage on a transmission line as a function of time.

FIG. 2 illustrates schematically the differential voltage between terminals TXP, TXN as a function of time at a transmitter during transmission of a logic level 1 followed by a logic level 0. For a logic level 1, the transmitter applies a positive differential voltage during a first phase over a first time period 201 followed by a negative differential voltage during a second phase over a second time period 202, and then followed by a zero differential voltage during a third phase over a third time period. The duration of the first and second time periods 201, 202 is approximately the same, while the duration of the third time period 203 is around twice that of each the first and second time periods. For a logic level 0, the transmitter first applies a negative differential voltage during a first phase, followed by a positive differential voltage in a second phase and a zero differential voltage in a third phase. Similar to that for a logic level 1, for the logic level 0 the third phase is around twice the length of each of the first and second phases.

To mitigate line attenuation, the differential voltage applied to the transmission line is made as high as possible. The power consumption of the transmitter mostly depends on the differential voltage applied and the bus load representing the equivalent resistance seen across the output connections TXP, TXN, which will include the termination resistance Rterm at the receiver side.

During the first and second phases, the transmitter power consumption will increase if the termination resistance is connected at the transmitter side. To reduce this, the termination resistance may be disconnected during the first and second phases to save on power consumption by the transmitter. An example of a switchable termination resistance to reduce losses when transmitting a signal along the transmission line is disclosed in WO 88/03731 A1, in which a termination resistor is switched into a transceiver circuit for a set length of time after a transmit/receive signal is enabled that is sufficient to receive the leading edge of a data bit over a transmission line.

For line transmission systems where operation at high voltages under electromagnetic interference is required, for example in automotive applications, the design of a switchable termination resistance may be more complex due to the limited maximum acceptable gate voltage of MOSFETs, high electromagnetic interference and high common mode voltages.

Figure 3:
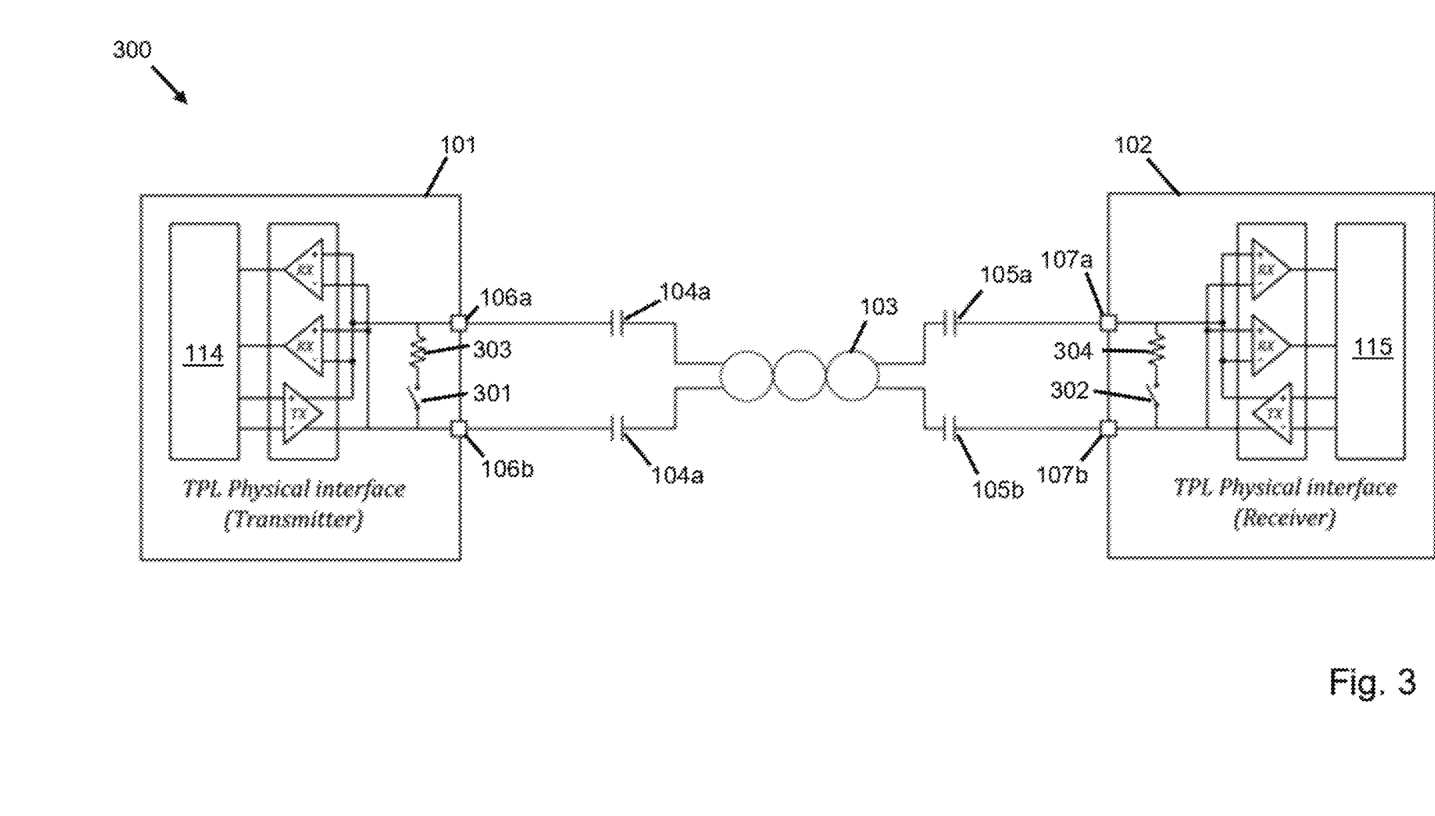
FIG. 3 is a schematic diagram of an alternative communication system comprising a pair of transceivers connected with a capacitively transmission line.

An alternative communication system 300 is illustrated in FIG. 3, in which a switchable termination resistance is provided between the terminals 106a, 106b, 107a, 107b of each transceiver 101, 102 by connecting the termination resistance Rterm 303, 304 in series with a switch 301, 302, each switch 301, 302 being controllable by a respective one of the controllers 114, 115. The other components of the system 300 are otherwise similar to those in FIG. 1. The switch 301, 302 allows each transceiver to disconnect the termination resistance Rterm 303, 304 on the transmit side during the 1st and 2nd phases (see FIG. 2), leading to half the power consumption for the same differential voltage due to the change of load upon disconnecting the resistance on the transmit side. This solution optimises power consumption but a disadvantage is that this results in a high induced common mode voltage when subjected to bulk current injection (BCI) interference. Although the solution works for transformer coupled transmission lines, a switched termination resistance is not an ideal solution in combination with a capacitively coupled transmission line.

SUMMARY

According to a first aspect there is provided a transmission line transceiver comprising:
  first and second terminals;
  a control module;
  an amplifier module connected between the control module and the first and second terminals;
  a switchable termination resistance circuit connected between the first and second terminals, the switchable termination resistance circuit comprising a termination resistance connected in series with a switch controllable by the control module;
  a pair of series connected resistors connected between the first and second terminals;
  a capacitor connected between a node connecting the pair of series connected resistors and a common node,
  wherein the control module is configured to operate the switch to disconnect the termination resistance during transmission of a signal via a transmission line capacitively connected to the first and second terminals.

According to a second aspect there is provided a communication system comprising:
  first and second transceivers, each of the first and second transceivers according to the first aspect; and a transmission line connected to the first and second terminals of each of the first and second transceivers via isolation capacitors.

Each of the series connected resistors may have an equal resistance value.

A resistance value of each of the series connected resistors may match a characteristic impedance of the transmission line.

The characteristic impedance of the transmission line may be around 120Ω+/−15%.

A resistance value of each of the series connected resistors may be greater than the resistance value of the termination resistance of each of the first and second transceivers. This allows the power consumption effect of the series connected resistors, which remain connected across the terminals, to be reduced.

The resistance value of each of the series connected resistors may in some examples be between around 150Ω and around 350Ω.

The capacitor may have a capacitance value of between around 10 nF and around 200 nF.

The control module may be configured to transmit a data bit on the transmission line by:

providing first and second pulses to the amplifier module to drive respective positive and negative differential voltage levels across the first and second terminals during respective first and second time periods while maintaining the switch open; and maintaining the switch closed during a subsequent third time period.

According to a third aspect there is provided a method of operating a transceiver according to the first aspect, the method comprising transmitting a data bit over the transmission line by:

the control module providing first and second pulses to the amplifier module to drive respective positive and negative differential voltage levels across the first and second terminals during respective first and second time periods; and the control module maintaining the switch closed during a subsequent third time period.

Each of the series connected resistors may have an equal resistance value.

A resistance value of each of the series connected resistors may match a characteristic impedance of the transmission line.

The characteristic impedance of the transmission line may be around 120Ω+/−15%.

A resistance value of each of the series connected resistors may be greater than the resistance value of the termination resistance.

The resistance value of each of the series connected resistors may be between around 150Ω and around 350Ω.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures may be shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 4:
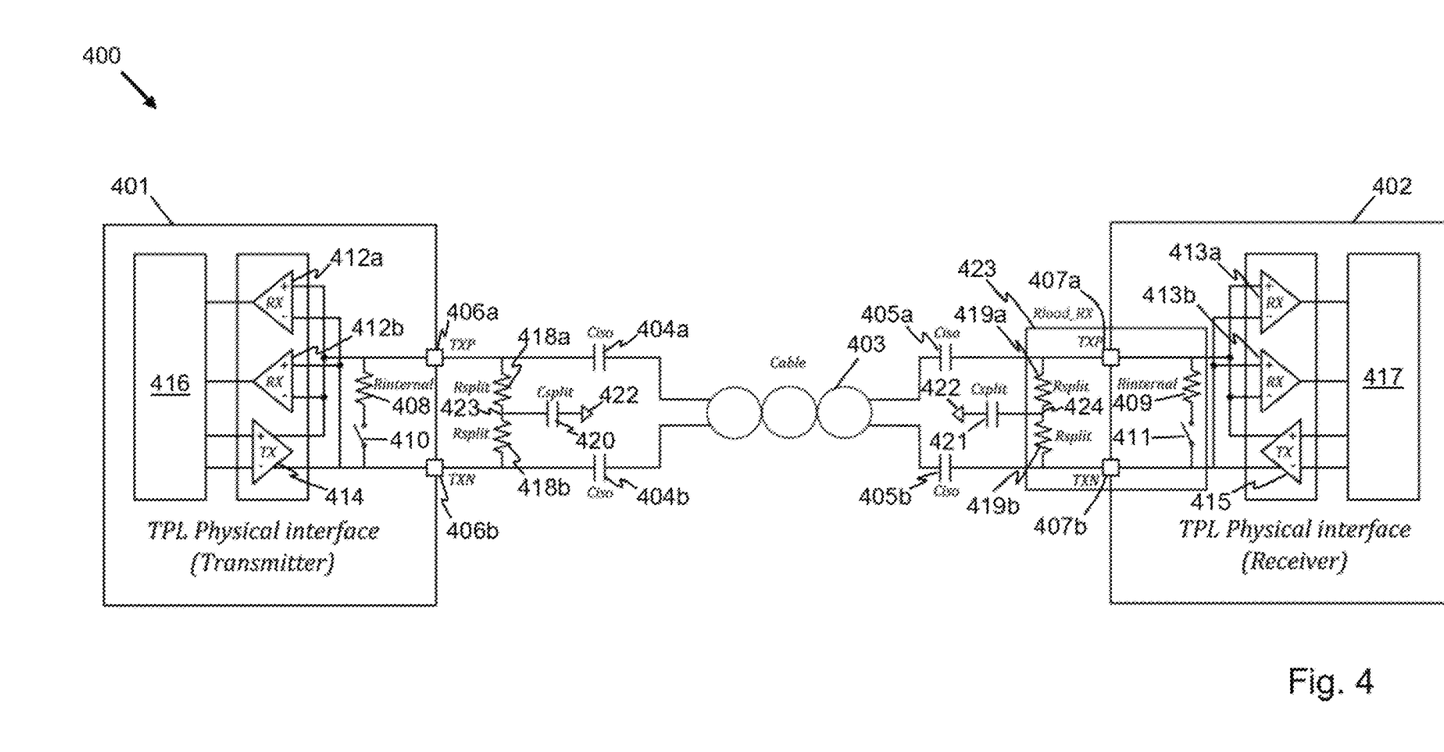
FIG. 4 is a schematic diagram of a further communication system comprising a pair of transceivers connected with a capacitively coupled transmission line with a split filter connected to each transceiver.

FIG. 4 illustrates a schematic diagram of an example communication system 400 comprising first and second transceivers 401, 402 connected by a transmission line 403, which in this example comprises a twisted wire pair. As with the communication system of FIG. 1, the transmission line 403 is isolated from the transceivers 401, 402 by isolation capacitors 404a, 404b, 405a, 405b at either end of the transmission line 403. In the illustrated example, the first transceiver 401 is in transmit mode and the second transceiver 402 is in receive mode. Each transceiver 401, 402 comprises a pair of terminals 406a, 406b, 407a, 407b that connect to the transmission line 403 via respective capacitors 404a, 404b, 405a, 405b. An internal termination resistance Rinternal 408, 409 is connected in series with a switch 410, 411 between the terminals 406a, 406b, 407a, 407b of each transceiver 401, 402. Each transceiver 401, 402 comprises two receiver amplifiers RX 412a, 412b, 413a, 413b and one transmitter amplifier TX 414, 415 connected between the terminals 406a, 406b, 407a, 407b and a control module 416, 417.

A pair of series connected resistors Rsplit 418a, 418b, 419a, 419b is connected between the terminals 406a, 406b, 407a, 407b of each transceiver 401, 402. A capacitor Csplit 420, 421 is connected between a node 423, 424 connecting the pair of series connected resistors 418a, 418b, 419a, 419b and a common node 422. The series connected resistors 419a, 419b and the switchable termination resistor 409 provide a combined receiver load resistance Rload_RX for the transceiver operating as a receiver, which in this example is the second transceiver 402.

The series connected resistors 418a, 418b, 419a, 419b and the capacitor 420, 421 are shown in FIG. 4 as being external from the transceiver 401, 402. This is largely due to the value of the capacitor 420, 421 needing to be typically between around 10 and 200 nF, which would result in a large IC area being taken up if the capacitor were to be internal to the transceiver. The switchable termination resistance circuit can, however, be internal to the transceiver 401, 402 because large capacitance values are not required. In a general aspect therefore, the switchable termination resistance circuit may be internal to the transceiver and the series connected resistors and capacitor external to the transceiver.

The termination resistance Rinternal may be matched to the characteristic impedance of the transmission line 403 in order to avoid a reflection effect and rebound during communication. The characteristic impedance of an example cable for a transmission line 403 may be around 120Ω.

The split resistances Rsplit are indicated in FIG. 4 as being connected external to each transceiver 401. The value for Rsplit may be selected that does not create misadaptation of the termination resistance, which results in the value for Rsplit being higher than the internal termination resistance Rinternal. Typically, the value for Rsplit maybe in the range 150-350Ω with a termination resistance as indicated above.

In a specific example, if the internal termination resistance value is set to 170Ω, in order to use as low as possible Rsplit with the same differential voltage generated, the total receiver load resistance Rload_RX should be around 130Ω, resulting in a value for Rsplit being around 300Ω.

With Rsplit-250Ω and Rinternal=170Ω, the receiver load resistance is Rload_RX=127Ω. The equivalent resistive load is 102Ω for the driver, which is the impedance seen by the driver during the 1st and 2nd phases when the internal termination resistance 409 is switched off.

With Rsplit-200Ω and Rinternal=170Ω, the receiver load resistance Rload_RX=119Ω and the equivalent resistive load is 92Ω.

With Rsplit=150Ω and Rinternal=170Ω, the receiver load resistance Rload_RX=109Ω and the equivalent resistive load is 80Ω.

Figure 5:
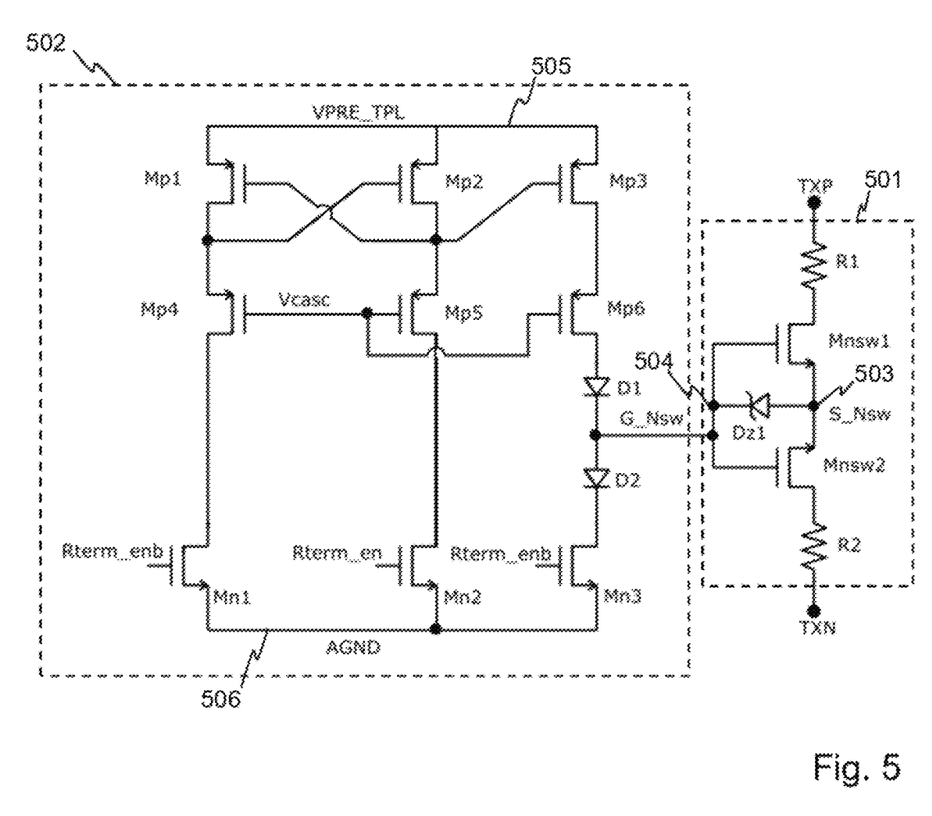
FIG. 5 is a schematic diagram of a switchable termination resistance circuit and associated driving circuit for a transmission line communication system.

FIG. 5 illustrates a schematic diagram of an example switchable termination resistance circuit 501 with an associated driving circuit 502. The switchable termination resistance circuit 501 is connected between first and second terminals TXP, TXN of a transceiver, such as either of the transceivers 101, 102 illustrated in FIG. 4. The switchable termination resistance circuit 501 comprises first and second resistors R1, R2 connected to respective first and second terminals TXP, TXN. First and second NMOS termination resistance switches Mnsw1, Mnsw2 are connected in series between the first and second resistors R1, R2. Source connections of the termination resistance switches Mnsw1, Mnsw2 are connected together and drain connections of the termination resistance switches Mnsw1, Mnsw2 are connected to the respective first and second resistors R1, R2. Switching on the first and second termination resistance switches Mnsw1, Mnsw2 by applying a gate voltage to the gates of the termination resistance switches Mnsw1, Mnsw2 connects the first resistor R1 to the second resistor R2 via the first and second termination resistance switches Mnsw1, Mnsw2, thereby connecting a termination resistance between the first and second terminals TXP, TXN. The total termination resistance comprises the first and second resistors R1, R2 in series, together with the source-drain resistances of the first and second termination resistance switches Mnsw1, Mnsw2 (which may be a few Ohms). Switching off the first and second termination resistance switches Mnsw1, Mnsw2 disconnects the termination resistance from the first and second terminals TXP, TXN, leaving the connection between terminals TXP, TXN open circuit.

Gate connections of the first and second termination resistance switches Mnsw1, Mnsw2 are connected to an input node 504, which is connected to an output of the driving circuit 502 for driving the switchable termination resistance circuit 501. Source connections of the first and second termination resistance switches Mnsw1, Mnsw2 are connected together at a midpoint node 503 of the switchable termination resistance circuit 501. A Zener diode Dz1 is connected between the input node 304 and the midpoint node 503, the cathode of the Zener diode Dz1 being connected to the input node 504. The Zener diode Dz1 maintains a gate-source voltage across the first and second termination resistance switches Mnsw1, Mnsw2 within a set voltage range defined by the breakdown voltage of the Zener diode. The Zener diode Dz1 thereby allows the switchable termination resistance circuit 501 to operate in the presence of electromagnetic interference, which may result in high voltages being induced across the first and second terminals TXP, TXN. The Zener diode may for example clamp the gate-source voltage across the termination resistance switches Mnsw1, Mnsw2 to 5V when the switchable terminal resistance circuit 501 is enabled.

During normal operation in the absence of electromagnetic interference, the common mode voltage on the transmission line connected to the first and second connections TXP, TXN may for example be around 2.5 V. To operate the switches Mnsw1, Mnsw2 a voltage at the input node 504 will need to be higher than around 5.5 V, but lower than the breakdown voltage of the Zener diode Dz1.

The driving circuit 502 provides the gate voltage G_Nsw to the input node 504 that operates the first and second termination resistance switches Mnsw1, Mnsw2. The driving circuit 502 is connected between a supply voltage line 505 providing a supply voltage VPRE_TPL (for example 7V) and a ground voltage line 506 at a ground voltage AGND (for example 0V).

The driving circuit 502 operates as a level shifter, allowing a low voltage input signal Rterm_en, Rterm_enb, to drive a higher voltage output signal G_Nsw, and allows the output voltage to float along with the voltage level at the midpoint node 503 of the switchable termination resistance circuit 501. To allow the output voltage to float, the driving circuit 302 comprises first and second diodes D1, D2 connected to the input node 504, the first diode D1 having its cathode connected to the input node 304 and the second diode D2 having its anode connected to the input node 504. Diodes D1, D2 prevent current flowing back into the driving circuit 502 from the switchable termination resistance circuit 501 in the presence of high levels of electromagnetic interference.

First, second and third NMOS switches Mn1, Mn2, Mn3 of the driving circuit 502 have source connections connected to the ground voltage line 505 and gate connections connected to receive a termination resistance enable signal Rterm_en or its inverse, Rterm_enb. Gate connections of the first and third NMOS switches Mn1, Mn3 receive Rterm_enb, while the second NMOS switch Mn2 receives Rterm_en.

The driving circuit 502 further comprises first, second, third, fourth, fifth and sixth PMOS switches Mp1-Mp6. A gate connection of the first PMOS switch Mp1 is connected to a drain connection of the second PMOS switch Mp2. A gate connection of the second PMOS switch Mp2 is connected to a drain connection of the first PMOS switch Mp1. Source connections of the first, second and third PMOS switches are connected to the supply voltage line 504. A gate connection of the third PMOS switch Mp3 is connected to the drain connection of the second PMOS switch Mp2.

A source connection of the fourth PMOS switch Mp4 is connected to the drain connection of the first PMOS switch Mp1 and a drain connection of the fourth PMOS switch Mp4 is connected to a drain connection of the first NMOS switch Mn1. A gate connection of the fourth PMOS switch Mp4 is connected to a gate connection of the fifth PMOS switch Mp5. A source connection of the fifth PMOS switch Mp5 is connected to the drain connection of the second PMOS switch Mp2. A drain connection of the fifth PMOS switch Mp5 is connected to a drain connection of the second NMOS switch Mn2.

Gate connections of the fifth and sixth PMOS switches Mp5, Mp6 are connected together. A source connection of the sixth PMOS switch Mp6 is connected to a drain connection of the third PMOS switch Mp3. A drain connection of the sixth PMOS switch Mp6 is connected to an anode connection of the first diode D1.

A drain connection of the third NMOS switch Mn3 is connected to the cathode connection of the second diode D2.

To turn on the termination resistance, the enable signal Rterm_en is provided to the second NMOS switch Mn2 and its inverse to the first and third NMOS switches Mn1, Mn3. The voltage applied at the input node 304 is then the supply voltage VPRE_TPL minus one diode voltage, i.e. the voltage across the first diode D1. The supply voltage VPRE_TPL needs to be sufficient to pull the gates of the termination switches Mnsw1, Mnsw2 but lower than that required to drive current through the Zener diode Dz1.

To turn off the termination resistance, the third NMOS switch Mn3 is turned on with Rterm_enb, which pulls down the drain of the NMOS switch Mn3 and the gate voltage at the input node 304 to one diode voltage about ground, thereby turning off the termination resistance switches Mnsw1, Mnsw2.

Figure 6:
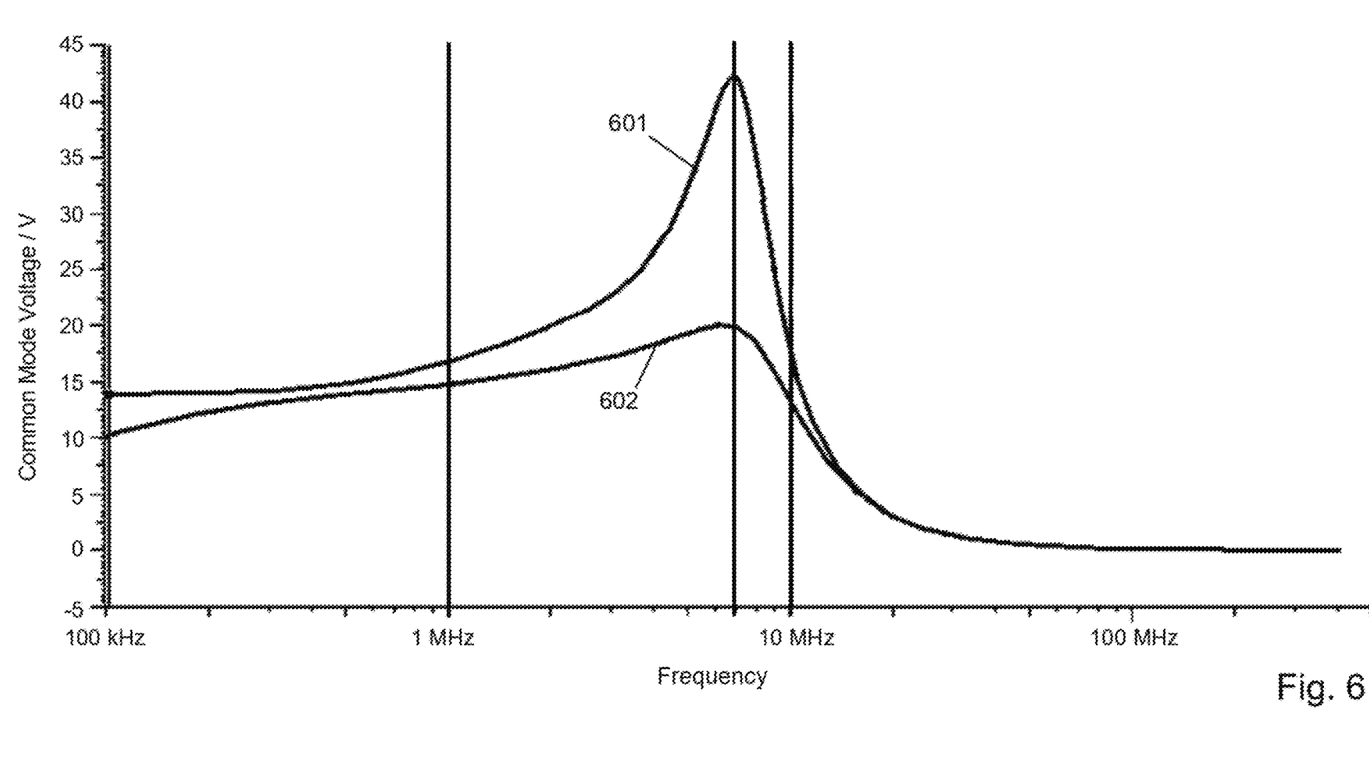
FIG. 6 is a plot of common mode voltage as a function of frequency for two different capacitively coupled transmission line communication systems.

In simulation, the difference in common mode voltage was evaluated for a communications system with the split resistance arrangement of FIG. 4 compared to a system with only a switchable internal termination resistance. The results of this simulation are illustrated in FIG. 6. A first plot 601 illustrates the common mode voltage as a function of frequency for a first communication system with only the switchable internal termination resistance. A second plot 602 illustrates the common mode voltage for a second communication system with the addition of the split resistance arrangement. The first communication system results in a peak common mode voltage of around 42V at around 7 MHZ, while the second communication system has a substantially lower peak common mode voltage of around 20V around the same frequency. In these simulated results, a value of 200Ω was selected for Rsplit was a value of 100 nF was selected for Csplit. The large effect of the split resistance arrangement can be seen particularly in the region of around 100 kHz to around 10 MHz.

Figure 7:
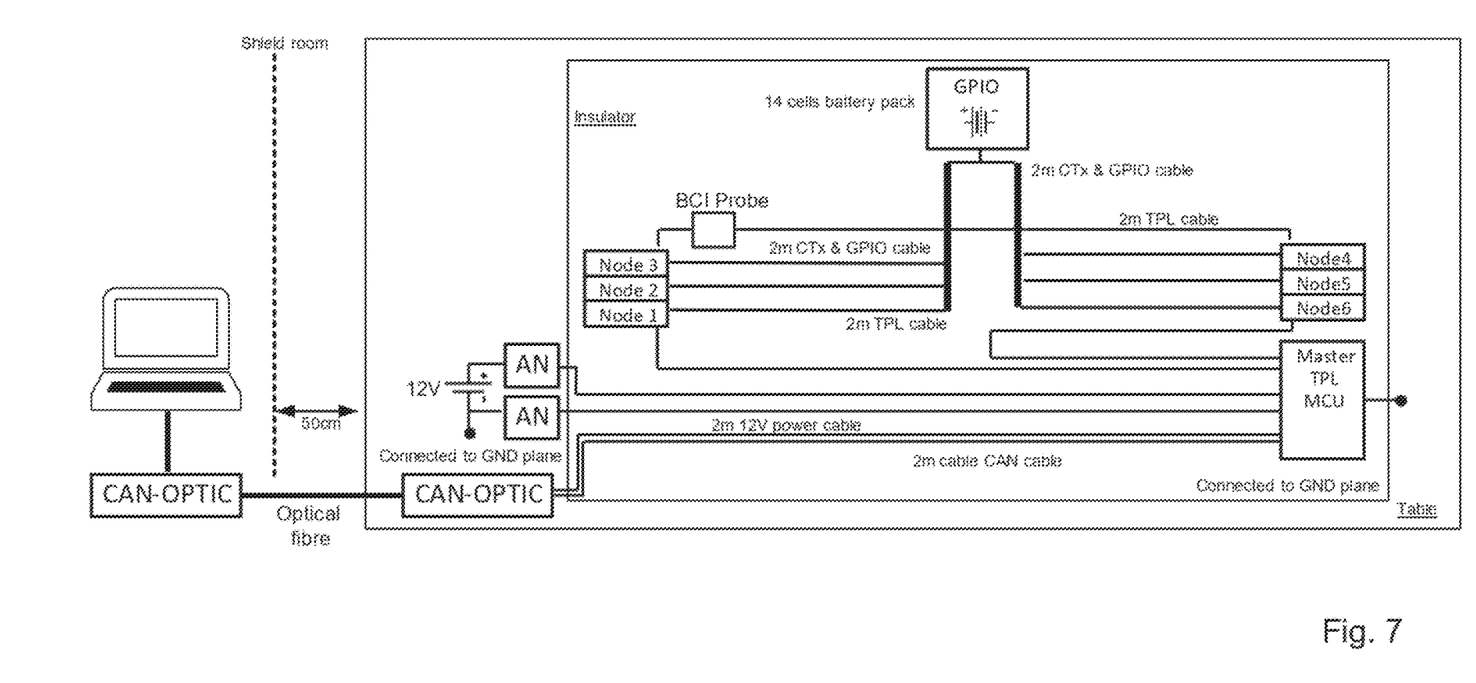
FIG. 7 is a schematic diagram of an experimental setup for testing of bulk current injection interference on a transmission line.

The arrangements were tested on silicon in BCI measurements using the experimental setup illustrated in FIG. 7, in which each of the nodes 1-6 represent a pair of transceivers as described herein, the nodes being controlled by a master TPL. Each of the nodes include two transceivers, for example node1 has a transceiver connected to the Master TPL and a second transceiver linked to node2. Also for example node3 has a first transceiver connected to node2 and a second transceiver of node3 is connected to node4 via a cable. BCI open loop levels were measured on transmission lines connecting each of the nodes. In the experimental setup, BCI was only injected on cables, for example on the cable between node3 and node4 at the position where the BCI probe is located. In alternative setups BCI may be injected on the cable between node1 and the Master TPL, which is not depicted in FIG. 7.

Figure 8:
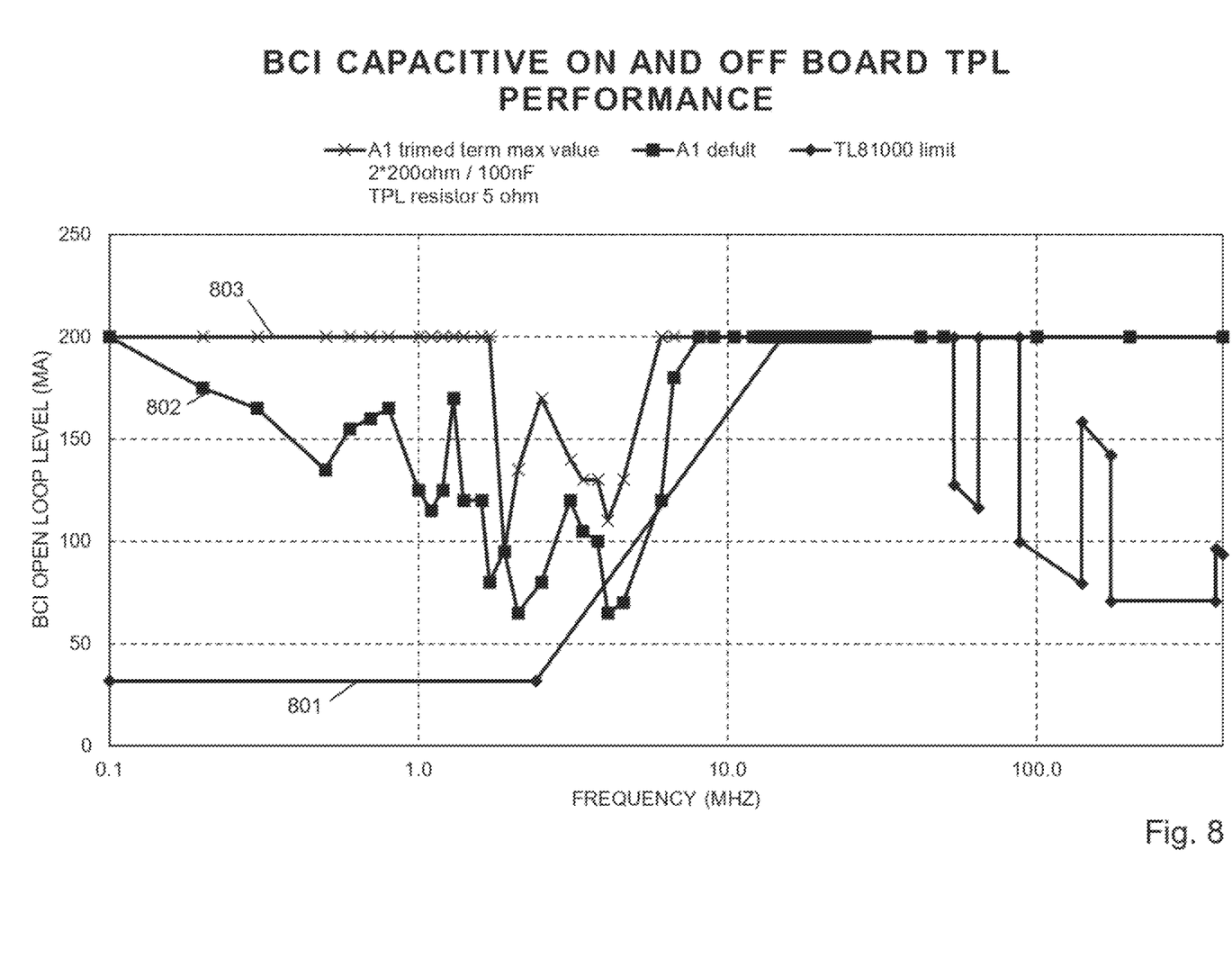
FIG. 8 is a plot of BCI open loop level as a function of frequency for a communication system with and without a split filter.

The results of the experimental arrangement are illustrated in FIG. 8, which shows plots of BCI open loop level (in mA) as a function of frequency (in MHz), compared to the limits defined by the VW TL81000 standard 801. A first plot 802 shows results using a switched termination resistance alone, which does not pass the standard due to falling below the required level between around 5-7 MHz. A second plot 803 shows results using a switched termination resistance in combination with a split resistor arrangement, with the values for Rsplit and Csplitof 200Ω and 100 nF respectively, which passes the standard over the entire frequency range. Moreover, at low frequencies the level of injection is increased from around 100/150 mA to around 200 mA, leading to a higher immunity to noise below 2 MHz. Further optimization by selection of values for the split resistances and capacitance may result in better performance.

Figure 9:
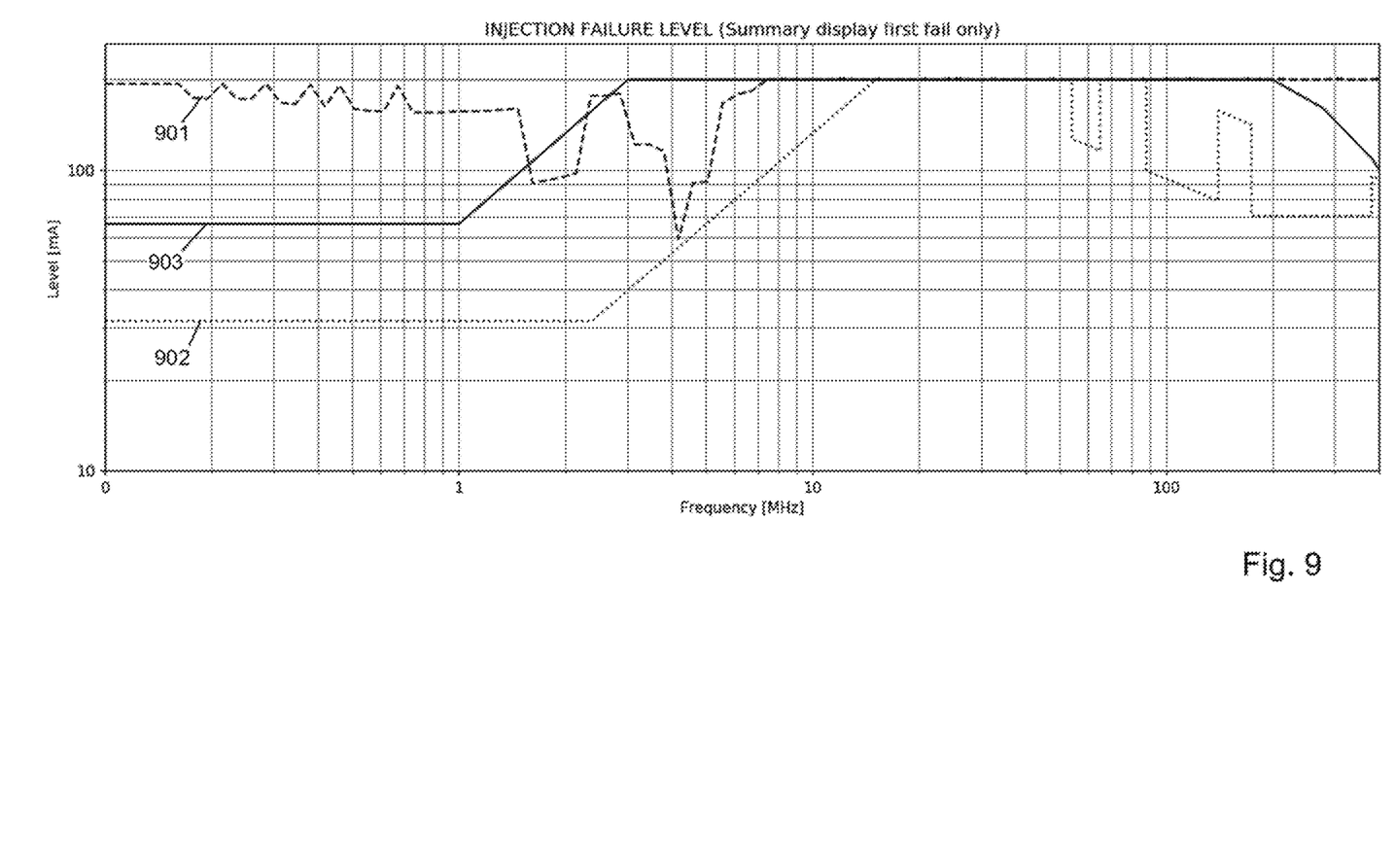
FIG. 9 is a plot of BCI open loop level as a function of frequency for a communication system with a switched termination resistance.

FIG. 9 illustrates a plot 901 of BCI open loop level as a function of frequency for a communications system with only an internal switchable termination resistance, i.e. similar to the arrangement in FIG. 3, compared to the TL81000 standard 902 and with the more stringent ISO 11452-4 Level 4 standard 903. This shows that, while meeting the TL81000 standard, the BCI level fails the more stringent standard 903 over the range of between around 1 and 6 MHz, which is due to a high common mode within this frequency range.

Figure 10:
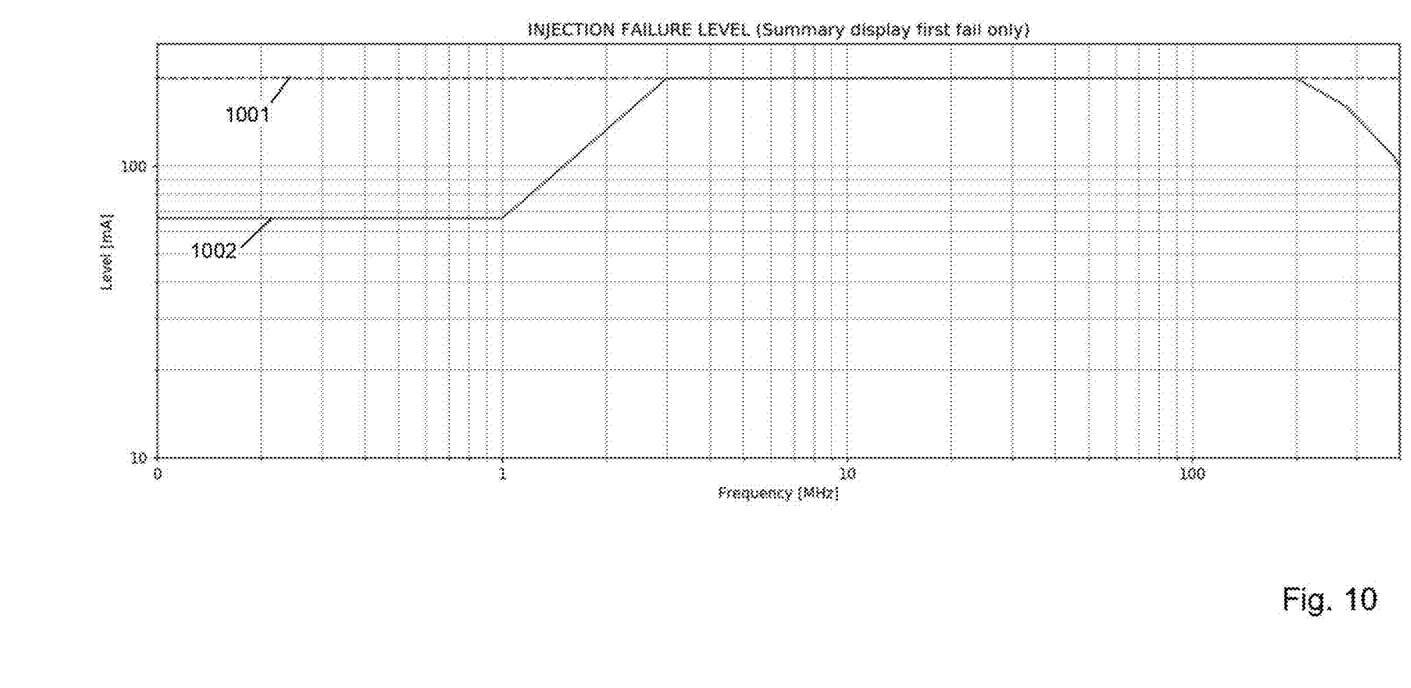
FIG. 10 is a further plot of BCI open loop level as a function of frequency for a communication system with a switched termination resistance with a split filter.

FIG. 10 illustrates a plot 1001 of BCI open loop level as a function of frequency for a communications system with the addition of a split resistance arrangement, i.e. similar to the arrangement of FIG. 4, again compared to the ISO 11452-4 Level 4 standard 1002. This shows that, with proper optimization of the components, the split resistance arrangement solution allows the system to pass a 200 mA BCI level over the full range of frequency. This was applied in two setups tested on a distributed system. The same setup was tested on a centralized board with similar results.

In summary, the split resistance arrangement described herein allows for a substantial improved in EMC robustness during BCI tests with for example only an increase of around 20% in power consumption during transmission compared to arrangements with an internal switchable termination resistance alone. The solution demonstrates a power consumption around 40% lower than conventional arrangements with only an external termination resistance.

The transmission system described herein may be particularly applicable in battery management systems, for example for vehicle battery systems, in which isolated electrical communication is required, current consumption is a critical parameter and electromagnetic interference may be high. The transmission system described herein may also be applicable in other applications where isolated transmission with a low current consumption, particularly in the presence of high electromagnetic interference, may be required.

From reading the present disclosure, other variations and modifications will be apparent to the skilled person. Such variations and modifications may involve equivalent and other features which are already known in the art of transmission line transceivers, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A transmission line transceiver comprising:
   first and second terminals;
   a control module;
   an amplifier module connected between the control module and the first and second terminals;
   a switchable termination resistance circuit connected between the first and second terminals, the switchable termination resistance circuit comprising a termination resistance connected in series with a switch controllable by the control module;
   a pair of series connected resistors connected between the first and second terminals;
   a capacitor connected between a node connecting the pair of series connected resistors and a common node,
   wherein the control module is configured to operate the switch to disconnect the termination resistance during transmission of a signal via a transmission line capacitively connected to the first and second terminals.

2. The transmission line transceiver of claim 1, wherein each of the series connected resistors has an equal resistance value.

3. The transmission line transceiver of claim 1, wherein a resistance value of each of the series connected resistors matches a characteristic impedance of the transmission line.

4. The transmission line transceiver of claim 3, wherein a resistance value of each of the series connected resistors is greater than the resistance value of the termination resistance of each of the first and second transceivers.

5. The transmission line transceiver of claim 1, wherein the resistance value of each of the series connected resistors is between around 150Ω and around 350Ω.

6. The transmission line transceiver of claim 1, wherein the capacitor has a capacitance value of between around 10 nF and around 200 nF.

7. A communication system comprising:
   first and second transceivers; and
   a transmission line connected to the first and second terminals of each of the first and second transceivers via isolation capacitors,
   wherein each of the first and second transceivers comprise:
   first and second terminals;
   a control module;
   an amplifier module connected between the control module and the first and second terminals;
   a switchable termination resistance circuit connected between the first and second terminals, the switchable termination resistance circuit comprising a termination resistance connected in series with a switch controllable by the control module;
   a pair of series connected resistors connected between the first and second terminals;
   a capacitor connected between a node connecting the pair of series connected resistors and a common node,
   wherein the control module is configured to operate the switch to disconnect the termination resistance during transmission of a signal via a transmission line capacitively connected to the first and second terminals.

8. The communication system of claim 7, wherein each of the series connected resistors has an equal resistance value.

9. The communication system of claim 7, wherein a resistance value of each of the series connected resistors matches a characteristic impedance of the transmission line.

10. The communication system of claim 8, wherein the characteristic impedance of the transmission line is within around 15% of 120Ω.

11. The communication system of claim 8, wherein a resistance value of each of the series connected resistors is greater than the resistance value of the termination resistance of each of the first and second transceivers.

12. The communication system of claim 7, wherein the resistance value of each of the series connected resistors is between around 150Ω and around 350Ω.

13. The communication system of claim 7, wherein the capacitor has a capacitance value of between around 10 nF and around 200 nF.

14. The communication system of claim 7, wherein the control module is configured to transmit a data bit on the transmission line by:
   providing first and second pulses to the amplifier module to drive respective positive and negative differential voltage levels across the first and second terminals during respective first and second time periods while maintaining the switch open; and
   maintaining the switch closed during a subsequent third time period.

15. A method of operating a transceiver, the transceiver comprising:
   first and second terminals;
   a control module;
   an amplifier module connected between the control module and the first and second terminals;
   a switchable termination resistance circuit connected between the first and second terminals, the switchable termination resistance circuit comprising a termination resistance connected in series with a switch controllable by the control module;
   a pair of series connected resistors connected between the first and second terminals;
   a capacitor connected between a node connecting the pair of series connected resistors and a common node,
   wherein the control module is configured to operate the switch to disconnect the termination resistance during transmission of a signal via a transmission line capacitively connected to the first and second terminals,
   the method comprising transmitting a data bit over the transmission line by:
   the control module providing first and second pulses to the amplifier module to drive respective positive and negative differential voltage levels across the first and second terminals during respective first and second time periods; and
   the control module maintaining the switch closed during a subsequent third time period.

16. The method of claim 15, wherein each of the series connected resistors has an equal resistance value.

17. The method of claim 15, wherein a resistance value of each of the series connected resistors matches a characteristic impedance of the transmission line.

18. The method of claim 17, wherein the characteristic impedance of the transmission line is within around 15% of 120Ω.

19. The method of claim 17, wherein a resistance value of each of the series connected resistors is greater than the resistance value of the termination resistance.

20. The method of claim 15, wherein the resistance value of each of the series connected resistors is between around 150Ω and around 350Ω.

\* \* \* \* \*